(12) United States Patent
Nakanishi et al.

(10) Patent No.: US 11,454,123 B2
(45) Date of Patent: Sep. 27, 2022

(54) METHOD FOR MACHINING FREE-FORM SURFACE ON ELONGATED MATERIAL

(71) Applicant: Mitsubishi Hitachi Power Systems, Ltd., Yokohama (JP)

(72) Inventors: Takuya Nakanishi, Yokohama (JP); Nobuo Shimizu, Yokohama (JP); Haruhiko Asaka, Yokohama (JP); Kazuya Matano, Yokohama (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 381 days.

(21) Appl. No.: 16/616,687

(22) PCT Filed: Jun. 27, 2018

(86) PCT No.: PCT/JP2018/024328
§ 371 (c)(1),
(2) Date: Nov. 25, 2019

(87) PCT Pub. No.: WO2019/004272
PCT Pub. Date: Jan. 3, 2019

(65) Prior Publication Data
US 2020/0208529 A1 Jul. 2, 2020

(30) Foreign Application Priority Data
Jun. 28, 2017 (JP) .............................. JP2017-126651

(51) Int. Cl.
*F01D 5/14* (2006.01)
*B23P 15/02* (2006.01)
(Continued)

(52) U.S. Cl.
CPC .............. *F01D 5/147* (2013.01); *B23P 15/02* (2013.01); *B24C 1/10* (2013.01); *B23C 3/18* (2013.01);
(Continued)

(58) Field of Classification Search
CPC ............... B23P 15/02; Y10T 29/49336; Y10T 29/49995; Y10T 29/49998
See application file for complete search history.

(56) References Cited

U.S. PATENT DOCUMENTS 5,964,016 A 10/1999 Ito et al.
6,543,134 B2 * 4/2003 Meier .................... F01D 5/005
29/889.7

(Continued)

FOREIGN PATENT DOCUMENTS

JP 59-027247 7/1984
JP 02-001604 1/1990
(Continued)

OTHER PUBLICATIONS

International Search Report dated Sep. 11, 2018 in International (PCT) Application No. PCT/JP2018/024328 with English translation.

(Continued)

*Primary Examiner* — Sarang Afzali
(74) *Attorney, Agent, or Firm* — Wenderoth, Lind & Ponack, L.L.P.

(57) ABSTRACT

After a free-form surface is machined on an elongated material 1 with a projection 3 and a blade root 4 held, the holding of the projection 3 is released to release strain generated during machining. Upon release of the holding, the entire elongated material 1 deforms, and the projection 3 moves from a holding position A to a strain-released position B. A re-holding position C obtained by correcting the position B by the deformation amount of the elongated material 1 due to the weight of the elongated material 1 is determined, and the projection 3 is held again at the re-holding position C for further machining the free-form surface on the elongated material 1.

10 Claims, 8 Drawing Sheets

(51) Int. Cl.
  *B24C 1/10* (2006.01)
  *B23Q 17/22* (2006.01)
  *B23C 3/18* (2006.01)

(52) U.S. Cl.
  CPC ...... *B23C 2215/44* (2013.01); *B23Q 17/2291* (2013.01); *F01D 5/141* (2013.01); *F05D 2230/90* (2013.01); *F05D 2240/303* (2013.01); *F05D 2250/70* (2013.01); *Y10T 29/49336* (2015.01); *Y10T 29/49995* (2015.01); *Y10T 29/49998* (2015.01); *Y10T 409/303864* (2015.01)

(56) References Cited

U.S. PATENT DOCUMENTS

| | | | | |
|---|---|---|---|---|
| 6,830,240 | B2 * | 12/2004 | Jones | B25B 5/06 269/254 R |
| 7,261,500 | B2 * | 8/2007 | Killer | B23C 3/18 409/199 |
| 10,105,804 | B2 * | 10/2018 | Horn | B23Q 3/063 |
| 2002/0091459 | A1 * | 7/2002 | Meier | B23P 6/007 29/889.1 |
| 2004/0062653 | A1 * | 4/2004 | Di Paola | F01D 5/323 416/221 |
| 2005/0186045 | A1 | 8/2005 | Killer et al. | |
| 2005/0268461 | A1 * | 12/2005 | Ouellette | B25B 5/087 29/889.7 |
| 2016/0107279 | A1 | 4/2016 | Horn et al. | |

FOREIGN PATENT DOCUMENTS

| | | |
|---|---|---|
| JP | 08-323421 | 12/1996 |
| JP | 10-76437 | 3/1998 |
| JP | 11-162730 | 6/1999 |
| JP | 2001-170801 | 6/2001 |
| JP | 2005-515907 | 6/2005 |
| JP | 2015-222207 | 12/2015 |
| JP | 2016-198837 | 12/2016 |

OTHER PUBLICATIONS

International Preliminary Report on Patentability and Written Opinion of the International Searching Authority dated Jan. 9, 2020 in International (PCT) Application No. PCT/JP2018/024328 with English translation.
First Office Action dated Dec. 11, 2017 in Japanese Application No. 2017-126651 with Machine Translation.

* cited by examiner

FIG. 8
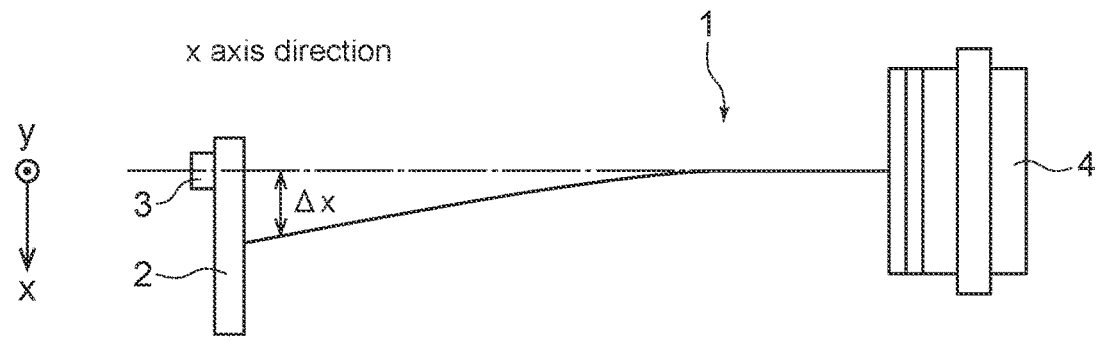
x axis direction
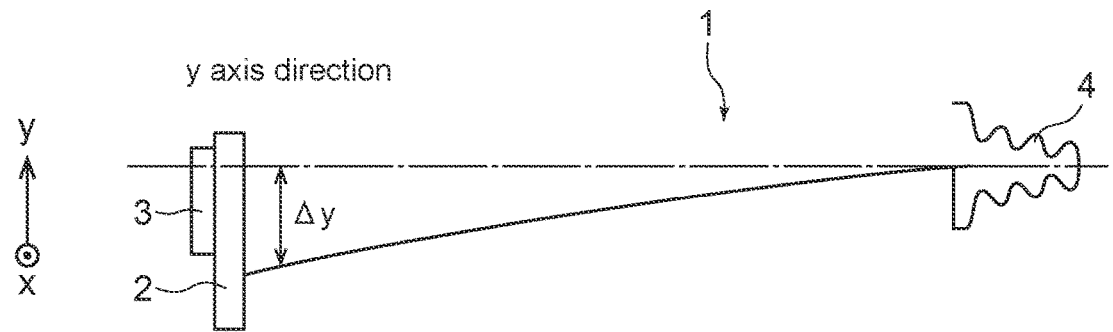
y axis direction
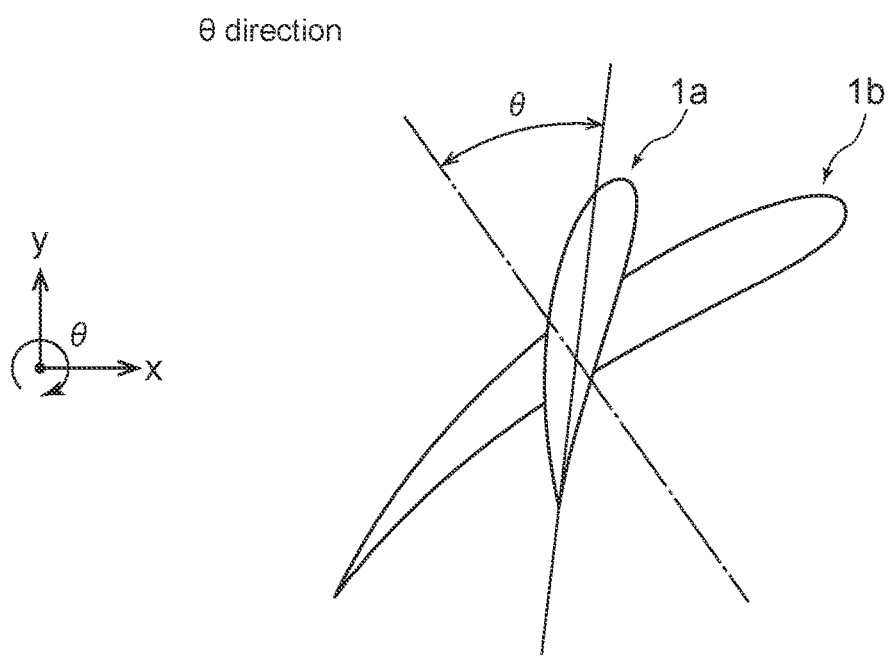
θ direction

METHOD FOR MACHINING FREE-FORM SURFACE ON ELONGATED MATERIAL

TECHNICAL FIELD

The present disclosure relates to a method for machining a free-form surface on an elongated material.

BACKGROUND ART

When an elongated material is machined into a turbine blade, conventionally, a blade root portion and a blade tip portion are kept in hold from roughing to finishing. In this case, strain occurs in the elongated material during roughing, and if the turbine blade is further machined as it is, the accuracy of a final finished state of the turbine blade degrades. Although not relating to machining of a turbine blade, Patent Document 1 discloses that, when machining an elongated material, the holding of one end of the elongated material is released after rough machining to release strain of the elongated material, and the end of the elongated material free from strain is held again before finishing.

CITATION LIST

Patent Literature

Patent Document 1: JPH10-76437A

SUMMARY

Problems to be Solved

However, in machining of an elongated material, the elongated material is generally held in a horizontal orientation. When one end of the elongated material in this state is released after rough machining, although strain generated during rough machining can be released, stress associated with deformation due to the own weight of the elongated material supported by only the other end remains. If the end of the elongated material is held again for finishing while leaving the stress associated with deformation due to its own weight, a desired final finished state of a product of the elongated material with the machined free-form surface may not be obtained.

In view of the above, an object of at least one embodiment of the present invention is to provide a method for machining a free-form surface on an elongated material whereby it is possible to improve the accuracy of a final finished state of a product of the elongated material with the machined free-form surface.

Solution to the Problems (1) A method for machining a free-form surface on an elongated material having a first end region and a second end region with respect to a longitudinal direction according to at least one embodiment of the present invention comprises: a step of holding the first end region and the second end region; a first machining step of machining the free-form surface on the elongated material with the first end region and the second end region held; a step of releasing holding of the first end region; a step of determining a re-holding position obtained by correcting a position of the first end region after the holding of the first end region is released by a deformation amount of the elongated material due to a weight of the elongated material; a step of holding the first end region again at the re-holding position; and a second machining step of further machining the free-form surface on the elongated material after holding the first end region again.

With the above method (1), since the second machining step is performed in a state free from the strain of the elongated material generated in the first machining step and the stress associated with deformation of the elongated material due to its own weight, it is possible to improve the accuracy of a final finished state of a product of the elongated material with the machined free-form surface.

(2) In some embodiments, in the above method (1), the deformation amount of the elongated material due to the weight of the elongated material is determined by an analysis or an experiment in advance, and, in the step of determining the re-holding position, a position shifted from the position of the first end region after the holding of the first end region is released by the deformation amount is determined as the re-holding position.

With the above method (2), since it is unnecessary to individually determine the deformation amount of the elongated material due to the own weight of the elongated material in the step of determining the re-holding position, it is possible to rapidly perform the method for machining the free-form surface on the elongated material.

(3) In some embodiments, in the above method (1) or (2), the deformation amount is a difference between a position of the first end region relative to the second end region when the elongated material is horizontally oriented and a position of the first end region relative to the second end region when the elongated material is vertically oriented.

With the above method (3), it is possible to accurately and easily obtain the deformation amount of the elongated material due to the own weight of the elongated material.

(4) In some embodiments, the above method (1) further comprises a step of vertically orientating the elongated material, with the holding of the first end region being released, after the step of releasing the holding of the first end region, and, in the step of determining the re-holding position, a position of the first end region relative to the second end region when the elongated material, with the holding of the first end region being released, is vertically oriented is determined as the re-holding position.

With the above method (4), since the re-holding position is determined in consideration of the deformation due to the own weight of the individual elongated material, it is possible to further improve the accuracy of a final finished state of a product of the elongated material with the machined free-form surface.

(5) In some embodiments, in any one of the above methods (1) to (4), after the second machining step, the step of releasing the holding of the first end region to the second machining step are repeated at least once.

With the above method (5), even when the step of machining the free-form surface is repeatedly performed, the free-form surface can be machined in a state free from the strain generated during machining of the free-form surface and the stress associated with deformation of the elongated material due to its own weight. Thus, it is possible to improve the accuracy of a final finished state of a product of the elongated material with the machined free-form surface.

(6) In some embodiments, any one of the above methods (1) to (5) further comprises a step of subjecting the free-form surface to surface treatment after the second machining step.

With the above method (6), it is possible to improve the mechanical properties of a product of the elongated material with the machined free-form surface.

(7) In some embodiments, in the above method (6), a deformation amount of the elongated material due to residual stress caused by the surface treatment is predicted in advance, and the free-form surface is machined in the second machining step in consideration of a predicted value.

With the above method (7), when strain generated by the surface treatment is applied to the elongated material with the machined free-form surface, a desired final finished state of a product of the elongated material with the machined free-form surface is obtained. Thus, it is possible to improve the accuracy of a final finished state of a product of the elongated material with the machined free-form surface.

(8) In some embodiments, in any one of the above methods (1) to (7), the first end region of the elongated material has a projection protruding from the first end region, and the first end region is held by holding the projection.

With the above method (8), since the projection protrudes from the first end region, the projection can be easily held, and machining can be easily performed.

(9) In some embodiments, in any one of the above methods (1) to (8), a product of the elongated material on which the free-form surface is machined is a blade.

With the above method (9), it is possible to provide a finished blade of a rotary machine with an improved accuracy.

(10) In some embodiments, in the above method (9), the first end region and the second end region are held so that a chordwise direction is oriented in a vertical direction at a blade tip side of the blade.

Since the blade is thinner on the blade tip side than on the blade root side, the blade tends to easily deform at the blade tip side upon application of a force in the out-of-plane direction (a direction perpendicular to the chordwise direction). However, with the above method (10), when the holding of the first end region is released so that only the second end region is supported, a force due to the weight of the blade acts in the in-plane direction (chordwise direction) of the blade at the blade tip side, which suppresses the deformation due to the weight of the blade. When the deformation due to the own weight of the blade is suppressed, variation in the re-holding position of the first end region among the individual blades is reduced. Thus, it is possible to effectively release the stress associated with deformation due to the own weight of the elongated material when holding the first end region again.

Advantageous Effects

According to at least one embodiment of the present invention, by performing the second machining step in a state free from the strain of the elongated material generated in the first machining step and the stress associated with deformation of the elongated material due to its own weight, it is possible to improve the accuracy of a final finished state of a product of the elongated material with the machined free-form surface.

BRIEF DESCRIPTION OF DRAWINGS

FIG. 8 is a diagram for describing deformation of the elongated material corresponding to a predicted value of deformation amount of the elongated material due to residual stress caused by shot peening.

DETAILED DESCRIPTION

Hereinafter, embodiments of the present invention will be described with reference to the drawings.

However, the scope of the present invention is not limited to the following embodiments. It is intended that dimensions, materials, shapes, relative positions and the like of components described in the embodiments shall be interpreted as illustrative only and not intended to limit the scope of the present invention.

A method according to some embodiments of the present invention will be described using an example where a blade of a rotary machine such as a turbine or a compressor is manufactured by machining a free-form surface on an elongated material. However, a product obtained by machining a free-form surface on an elongated material is not limited to a blade of a rotary machine.

Figure 1:
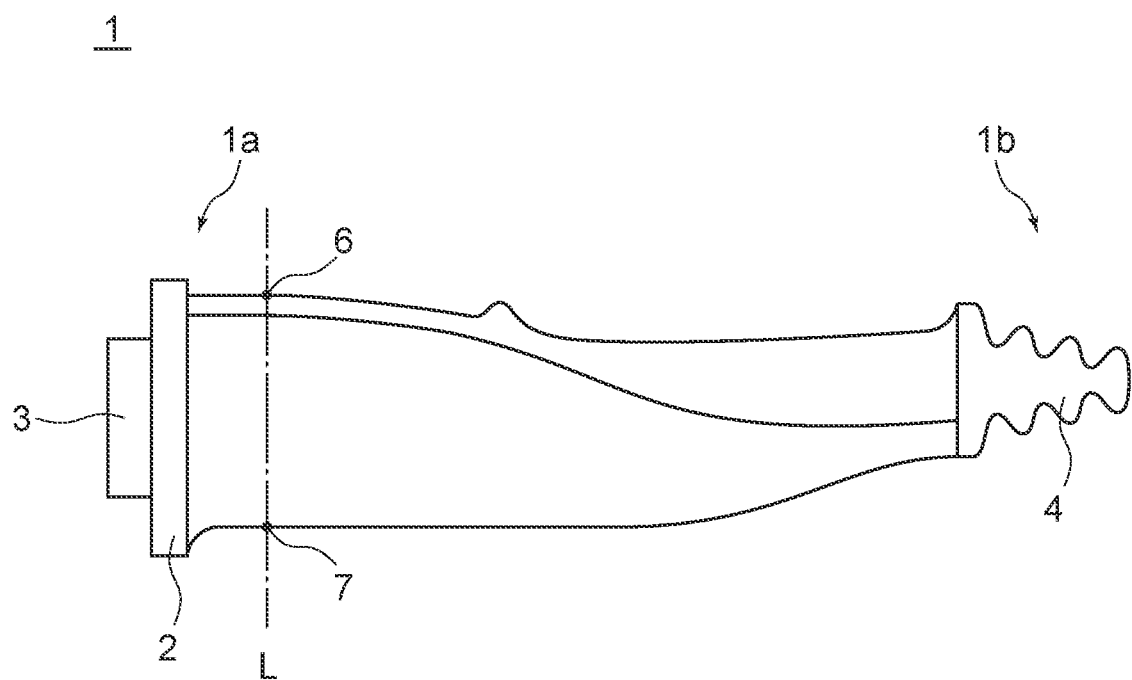
FIG. 1 is a diagram of an elongated material used in a method according to an embodiment of the present invention.

As shown in FIG. 1, an elongated material 1 on which a free-form surface is machined includes a first end region 1a and a second end region 1b with respect to the longitudinal direction of the elongated material 1. The first end region 1a include a shroud 2. The shroud 2 has a projection 3 protruding from the shroud 2. The projection 3 may have a substantially rectangular plate shape. The first end region 1a may have a reference surface for machining or measuring, not limited to the protruding projection. The second end region 1b includes a blade root 4 of a blade which is a finished product.

The method according to an embodiment of the present disclosure will be described with reference to the flowchart of FIG. 2. First, in step S1, the projection 3 and the blade root 4 are held by respective jigs. Exemplary embodiments of holding the projection 3 and the blade root 4 will be described in detail below individually. However, the configuration of the jigs for holding the projection 3 and the blade root 4 and the holding methods may be any jig and any method, not limited to the following embodiments.

Figure 3:
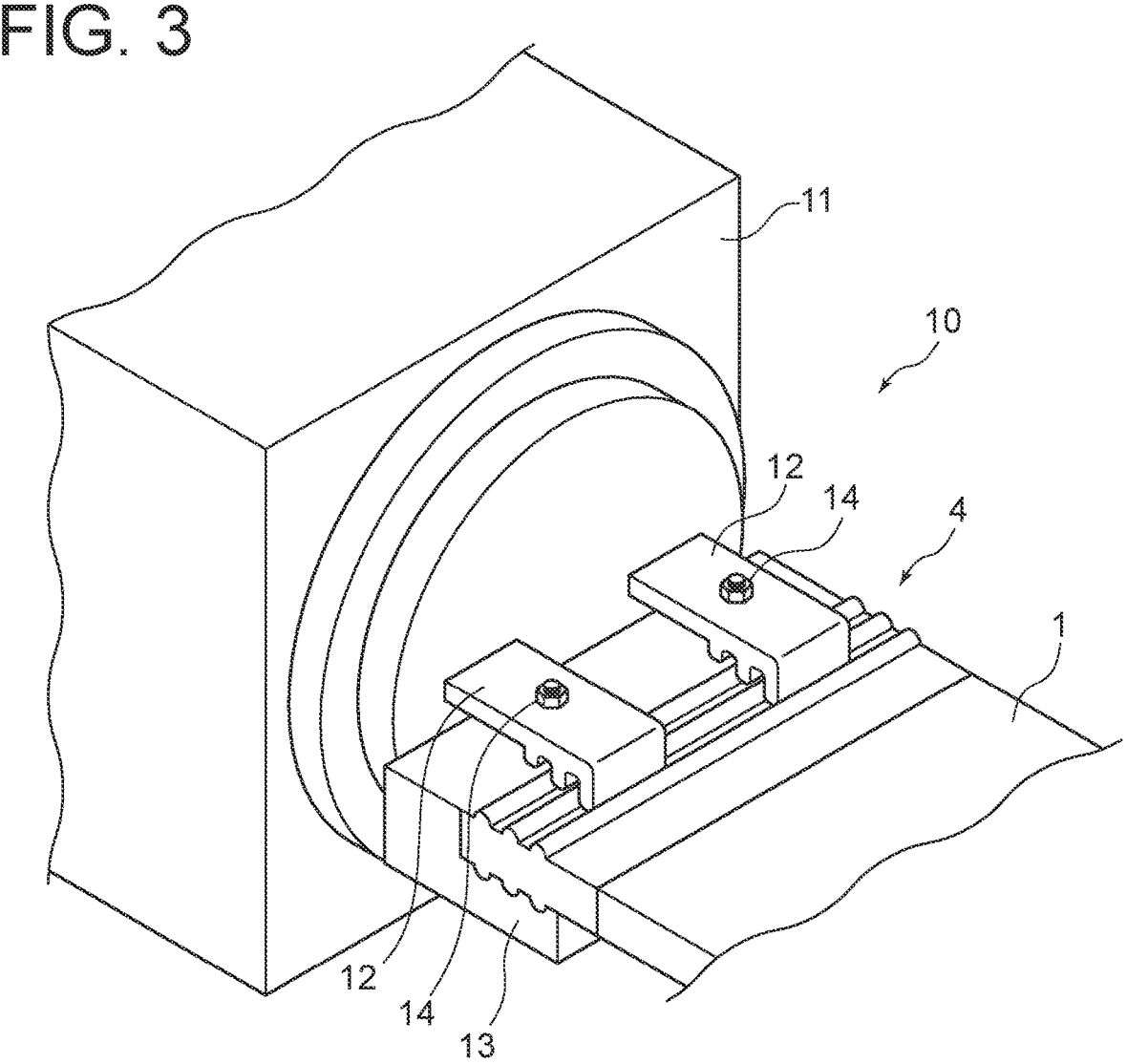
FIG. 3 is a perspective view of a first holder for holding a blade root in a method according to an embodiment of the present invention.

As shown in FIG. 3, in an embodiment, the jig for holding the blade root 4, i.e., a first holder 10, includes a base 11, a support 13 for supporting the blade root 4 from below, and two holding plates 12, 12 for clamping the blade root 4 between the holding plates 12, 12 and the support 13. The support 13 has a groove corresponding to a groove of the blade root 4. Each holding plate 12 also has a groove corresponding to the groove of the blade root 4. By fixing the holding plates 12 to the support 13 with bolts 14 while the blade root 4 is clamped between the holding plates 12 and the support 13, the blade root 4 is held by the first holder 10.

Figure 4:
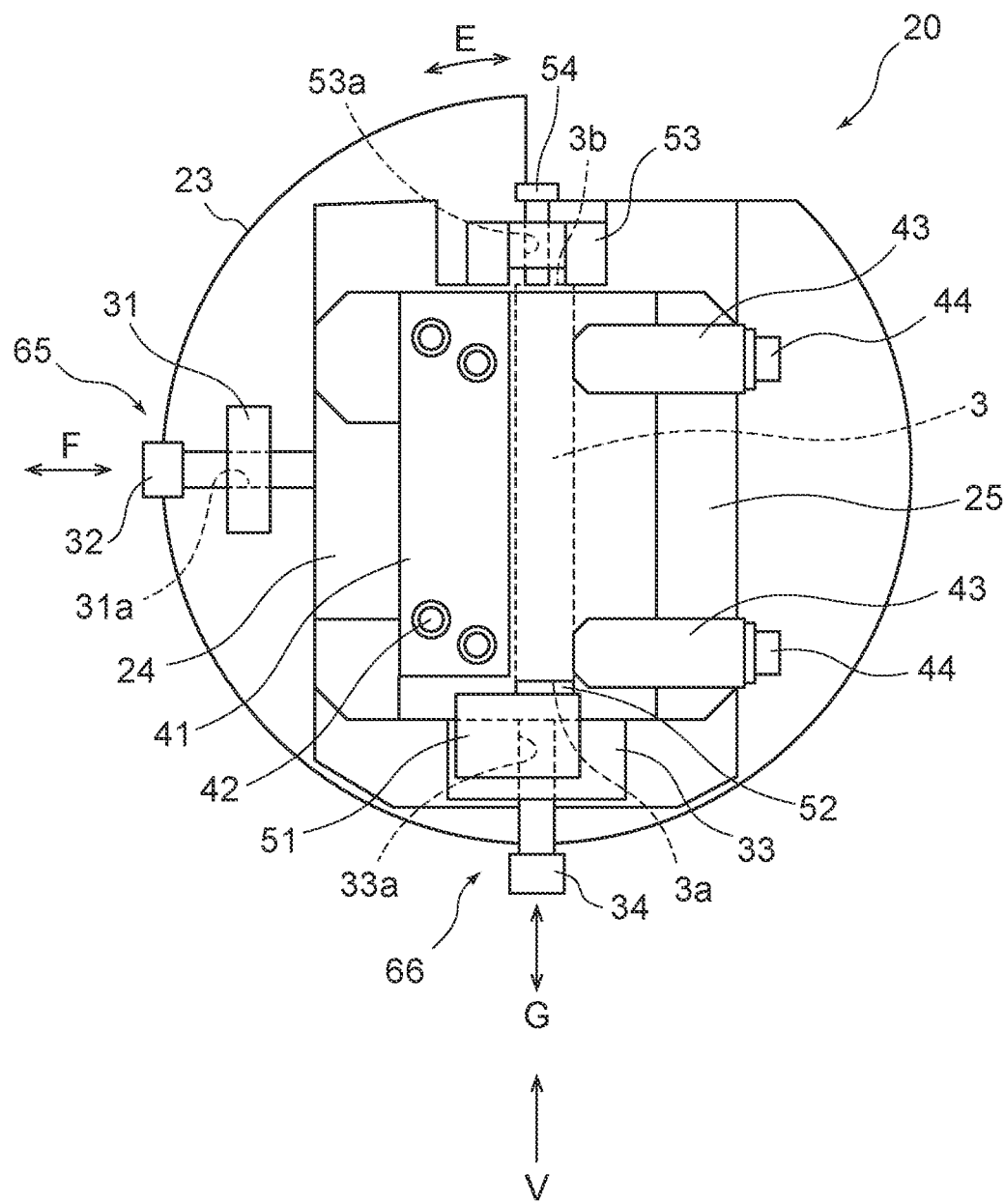
FIG. 4 is a front view of a second holder for holding a projection in a method according to an embodiment of the present invention.
Figure 5:
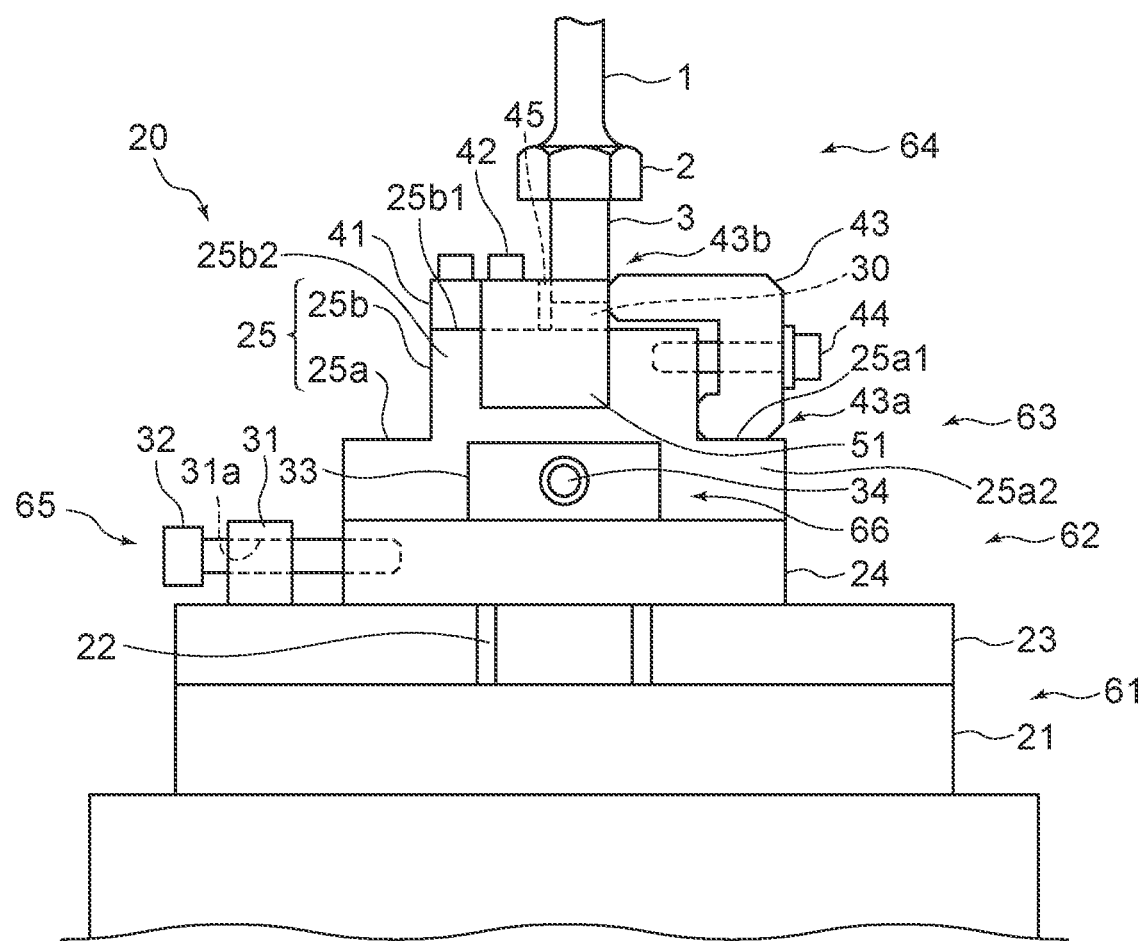
FIG. 5 is a view of FIG. 4 as seen from the direction of the arrow V.

As shown in FIGS. 4 and 5, in an embodiment, the jig for holding the projection 3, i.e., a second holder 20, includes a base 21, a rotating mechanism part 61 rotatable with respect to the base 21, a first sliding mechanism part 62 linearly slidable with respect to the rotating mechanism part 61, a second sliding mechanism part 63 linearly slidable with respect to the first sliding mechanism part 62 in a direction perpendicular to the sliding direction of the first sliding mechanism part 62, and a holding mechanism part 64 disposed on the second sliding mechanism part 63 and configured to hold the projection 3.

The jig for holding the projection 3 may be any jig having a mechanism of sliding in the rotational direction E and directions F and G (see FIG. 4), not limited to a holding jig described below.

As shown in FIG. 5, the rotating mechanism part 61 includes a bush 22 fixed to the base 21, and a plate 23 rotatably disposed with respect to the bush 22. Upon rotation with respect to the bush 22, the plate 23 rotates in the direction of the arrow E (see FIG. 4) with respect to the base 21.

The first sliding mechanism part 62 includes a first pad 24 slidably disposed with respect to the plate 23, and a first slider 65 for sliding the first pad 24. The first slider 65 includes a frame 31 fixed to the plate 23, and a screw 32 inserted in a through hole 31a formed in the frame 31. The inner peripheral surface of the through hole 31a is threaded and is mateable with the thread of the screw 32. The tip portion of the screw 32 is coupled with the first pad 24. By displacing the position of the screw 32 relative to the frame 31, the first pad 24 linearly slides in the direction of the arrow F in accordance with the displacement of the screw 32.

The second sliding mechanism part 63 includes a second pad 25 slidably disposed with respect to the first sliding mechanism part 62, and a second slider 66 for sliding the second pad 25. As shown in FIG. 4, the second slider 66 includes a frame 33 fixed to the first pad 24, and a screw 34 inserted in a through hole 33a formed in the frame 33. The inner peripheral surface of the through hole 33a is threaded and is mateable with the thread of the screw 34. The tip portion of the screw 34 is coupled with the second pad 25. By displacing the position of the screw 34 relative to the frame 33, the second pad 25 linearly slides in the direction of the arrow G in accordance with the displacement of the screw 34. The direction of the arrow G is perpendicular to the direction of the arrow F.

As shown in FIG. 5, the second pad 25 includes a base portion 25a and a protruding portion 25b having a horizontal length shorter than the base portion 25a and protruding from the base portion 25a. The holding mechanism part 64 includes a plate-shaped holding plate 41 and two holding metal fittings 43 having an L-shaped cross-sectional shape. The holding plate 41 is fixed with a bolt 42 to a front surface 25b1 of the protruding portion 25b opposite to the base portion 25a. An end portion 43a of each holding metal fitting 43 abuts on a front surface 25a1 of the base portion 25a and a side surface 25b2 of the protruding portion 25b and is fixed to the protruding portion 25b with a bolt 44. The front surface 25a1 is a surface on which the protruding portion 25b is disposed, and the side surface 25b2 is a surface connecting the front surface 25a1 and the front surface 25b1. By fixing the protruding portion 25b with the bolt 44 while a shim plate 45 having an appropriate thickness and the projection 3 of the elongated material 1 are inserted in a space between the holding plate 41 and the holding metal fitting 43, the projection 3 is held by the second holder 20 so as to be clamped between the holding plate 41 and the holding metal fitting 43.

Further, as shown in FIG. 4, the protruding portion 25b (see FIG. 5) is provided with a supporting portion 51 and a frame 53. When the projection 3 is clamped between the holding plate 41 and the holding metal fitting 43, the supporting portion 51 is positioned below the projection 3, and the frame 53 is positioned above the projection 3. The supporting portion 51 supports a lower end surface 3a of the projection 3 via the shim plate 52. The frame 53 has a through hole 53a having a threaded inner peripheral surface mateable with the thread of the bolt 54. By inserting the bolt 54 in the through hole 53a and pressing the tip of the bolt 54 on an upper end surface 3b of the projection 3, the projection 3 is held between the supporting portion 51 and the bolt 54.

Here, the projection 3 and the blade root 4 are preferably held so that the chordwise direction L (FIG. 1) connecting a leading edge 6 and a trailing edge 7 is oriented in the vertical direction at the blade tip side of the blade which is a finished product. Since the blade is thinner on the blade tip side than on the blade root 4 side, the blade tends to easily deform at the blade tip side upon application of a force in the out-of-plane direction (a direction perpendicular to the chordwise direction). When the holding of the projection 3 is released so that only the blade root 4 is supported, a force due to the weight of the blade acts in the in-plane direction (chordwise direction) of the blade at the blade tip side, which suppresses the deformation due to the weight of the blade.

Further, in the method according to an embodiment of the present invention, the projection 3 is held so as to be clamped between the holding metal fitting 43 and the holding plate 41 and between the supporting portion 51 and the bolt 54 from a direction perpendicular to the longitudinal direction connecting the first end region 1a and the second end region 1b of the elongated material 1. Similarly, the blade root 4 is held so as to be clamped between the holding plate 12 and the support 13 from a direction perpendicular to the longitudinal direction connecting the first end region 1a and the second end region 1b of the elongated material 1. That is, a pressing force in a direction from the first end region 1a to the second end region 1b and a pressing force in a direction from the second end region 1b to the first end region 1a are not applied to the elongated material 1. In order not to apply such pressing forces to the elongated material 1, as shown in FIG. 5, the projection 3 is held by the second holder 20 so that a space 30 is formed between the projection 3 and the front surface 25b1 of the protruding portion 25b of the second pad 25. By holding the projection 3 and the blade root 4 so as not to apply such pressing forces to the elongated material 1, it is possible to avoid a buckling phenomenon where the elongated material 1 is deflected at a low strength portion, for instance, at a thin portion.

Figure 2:
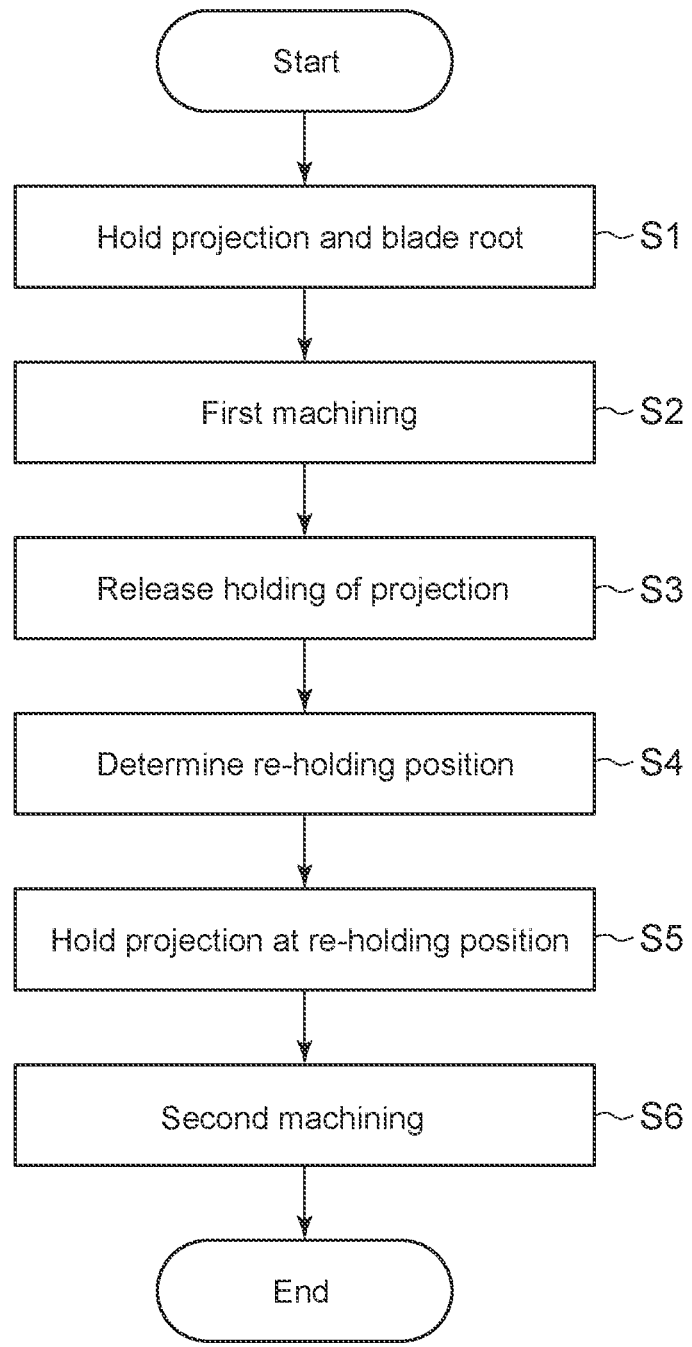
FIG. 2 is a flowchart of a method according to an embodiment of the present invention.

As shown in FIG. 2, after the completion of step S1, a first machining step is performed to machine a free-form surface on the elongated material with the projection 3 and the blade root 4 held (step S2). During machining of the free-form surface, strain occurs in the elongated material 1. In order to release the strain, after the first machining step, the holding of the projection is released (step S3).

Figure 6:
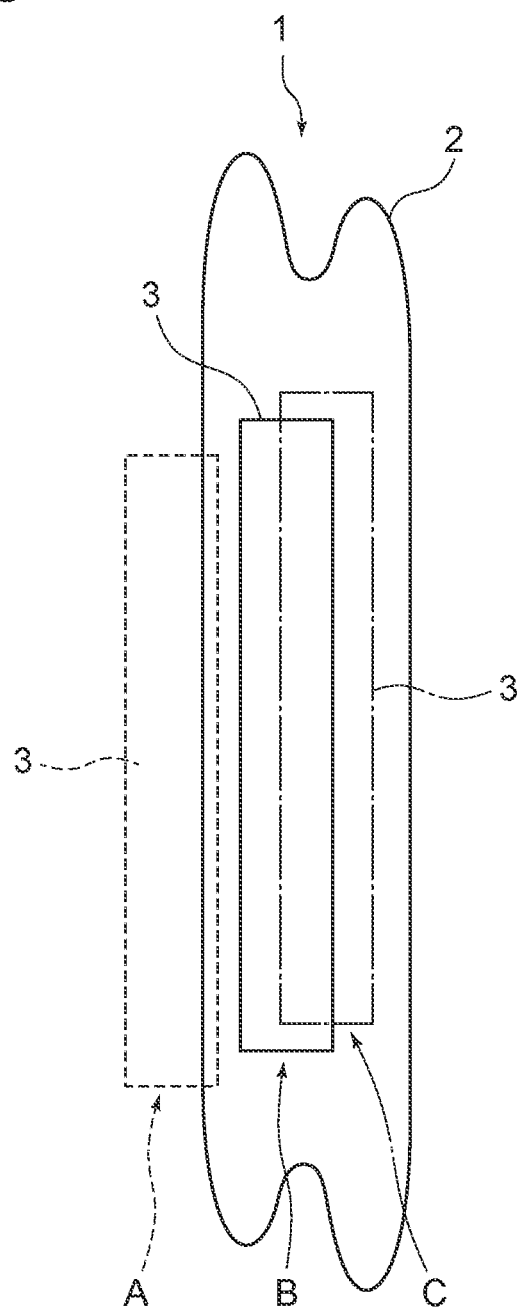
FIG. 6 is a diagram showing a position of the projection when the holding of the projection is released after completion of the first machining step, and a re-holding position at which the projection is held again in a method according to an embodiment of the present invention.

As shown in FIG. 6, the entire elongated material 1 deforms when the strain is released upon release of the holding of the projection 3. As a result, the projection 3 is shifted from a holding position A to a strain-released position B. Then, the projection 3 is held again to further machine the free-form surface on the elongated material 1. However, when the holding of the projection 3 is released, only the blade root 4 (see FIG. 1) is held by the first holder 10, so that the elongated material 1 is deformed due to its own weight. Accordingly, if the projection 3 is held again at the position B after strain release in the first machining step, and the free-form surface is further machined on the elongated material 1 in this state, the elongated material 1 is machined while leaving the stress associated with deformation due to the own weight of the elongated material 1. In this case, a desired accuracy of a final finished state of the blade may not be obtained. Therefore, it is necessary to determine a re-holding position C obtained by correcting the position B by a deformation amount of the elongated material 1 due to its own weight (step S4 of FIG. 2), and to hold the projection 3 at the re-holding position C. The step of determining the re-holding position C will now be described below.

In an embodiment, in the step of determining the re-holding position, a deformation amount due to the own weight of the elongated material 1 is determined in advance, and a position shifted from the position B in FIG. 6 by the deformation amount is determined as the re-holding position C. The deformation amount may be determined by an analysis or an experiment. The determination based on experiment may include calculating a difference between the position of the first end region 1a relative to the second end region 1b when the elongated material 1 is horizontally oriented and the position of the first end region 1a relative to the second end region 1b when the elongated material 1 is oriented vertically, and determining the difference as the deformation amount. More specifically, a difference between the position of the projection 3 relative to the blade root 4 when the elongated material 1 is horizontally oriented and the position of the projection 3 relative to the blade root 4 when the elongated material 1 is vertically oriented may be calculated. Alternatively, for instance, a difference between the shape of a blade produced by subsequent steps without considering the deformation due to the own weight of the elongated material by holding the projection 3 at the position B as the re-holding position and a desired shape of the blade may be calculated, and this difference may be determined as the deformation amount. When the deformation amount due to the own weight of the elongated material 1 is determined in advance, it is unnecessary to individually determine the deformation amount due to the own weight of the elongated material 1 in step S4 of determining the re-holding position. Thus, it is possible to rapidly perform step S4.

In another embodiment, in the step of determining the re-holding position, the elongated material 1 with the holding of the projection 3 being released may be oriented vertically, and the position of the projection 3 relative to the blade root 4 in this state may be determined as the re-holding position C. When the elongated material 1 is vertically oriented, the stress associated with deformation due to the own weight of the elongated material 1 is released. Accordingly, when the elongated material 1 is vertically oriented with the holding of the projection 3 being released, both the strain generated in the first machining step and the stress associated with deformation due to the own weight of the elongated material 1 are released, and the position of the projection 3 relative to the blade root 4 in this state is determined as the re-holding position C. Thus, by vertically orienting the elongated material 1 after the holding of the projection 3 is released in step S4, the re-holding position C is determined in consideration of the deformation due to the own weight of the individual elongated material 1. Consequently, it is possible to further improve the accuracy of a final finished state of the blade.

As shown in FIG. 2, after the completion of step S4, the projection 3 is held again at the determined re-holding position C (step S5). The holding of the projection 3 at the re-holding position C (see FIG. 6) may be performed by selecting the shim plate 45 (see FIG. 5) having an appropriate width and clamping the shim plate 45 and the projection 3 between the holding metal fitting 43 and the holding plate 41 so that the projection 3 is held at the re-holding position C. If the displacement between the position A and the re-holding position C is large, as shown in FIG. 4, by rotating the plate 23 in the direction of the arrow E, sliding the first pad 24 in the direction of the arrow F, and sliding the second pad 25 in the direction of the arrow G so as to move the second holder 20 to the re-holding position C, it is possible to hold the projection 3 at the re-holding position C.

After completion of step S5, in a state free from the strain generated in the first machining step and the stress associated with the own weight of the elongated material 1, a second machining step is performed for further machining the free-form surface on the elongated material 1 with the projection 3 and the blade root 4 held (step S6). As described above, when the deformation due to the own weight of the blade is suppressed by holding the projection 3 and the blade root 4 so that the chordwise direction L is oriented in the vertical direction at the blade tip side of the blade, variation in the re-holding position of the projection 3 among the individual blades is reduced, and it is possible to effectively release the stress associated with deformation due to the own weight of the elongated material 1 when holding the projection again. In an embodiment, the first machining step may be rough machining of the free-form surface, and the second machining step may be finish machining of the free-form surface. In this case, after completion of step S6 of finish machining, the blade is finished, and the method according to this embodiment ends.

Thus, by performing the second machining step in a state free from the strain of the elongated material 1 generated in the first machining step and the stress associated with deformation of the elongated material 1 due to its own weight, it is possible to improve the accuracy of the a final finished state of the blade.

Figure 7:
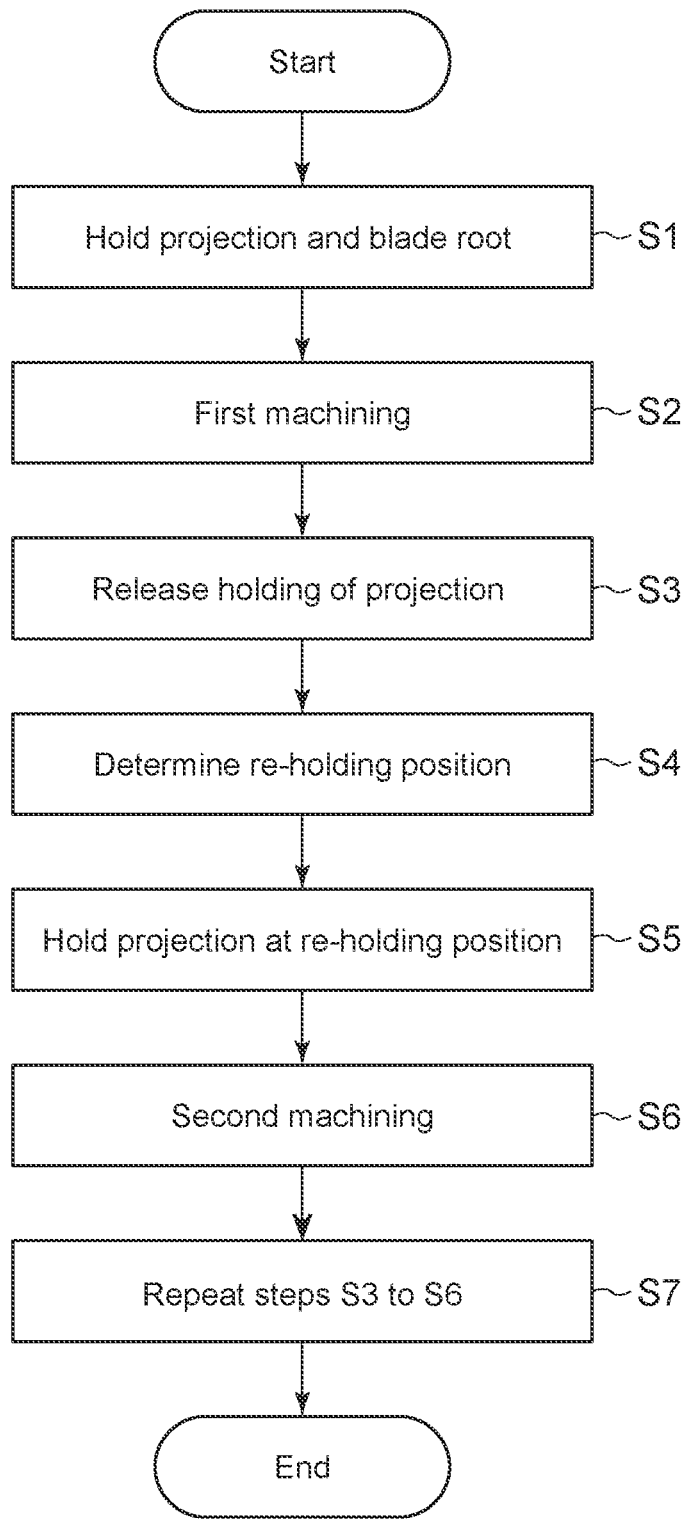
FIG. 7 is a flowchart of a method according to another embodiment of the present invention.

In another embodiment, as shown in FIG. 7, after completion of step S6, steps S3 to S6 may be repeated at least once (step S7). In the case where the second machining step is performed several times, by performing steps S3 to S5 for each second machining step, every second machining step can be performed in a state free from the strain generated during machining of the free-form surface and the stress associated with deformation of the elongated material 1 due to its own weight. Thus, it is possible to improve the accuracy of a final finished state of the blade.

In still another embodiment, after completion of step S6 in the flowchart of FIG. 2, or after completion of step S7 in the flowchart of FIG. 7, the elongated material 1 on which the free-form surface is machined may be subjected to surface treatment such as shot peening to improve mechanical properties. In this case, in the final second machining step in step S6 in the flowchart of FIG. 2 or in step S7 in the flowchart of FIG. 7, a deformation amount of the elongated material 1 due to residual stress caused by the surface treatment or due to additional reaction by a step before or after the surface treatment may be predicated, and the free-form surface may be machined in consideration of the predicted deformation amount. The predicted deformation amount may be determined by an analysis or an experiment. The shot peening includes glass shot peening and steel shot peening. Other examples of the surface treatment include grid blasting, thermal spraying of coating, inorganic coating, plating, induction hardening, heat treatment such as carburizing and nitriding treatment, and polishing.

FIG. 8 shows an example of the shape of the elongated material 1 machined in consideration of the predicated deformation amount in the second machining step before the surface treatment. In FIG. 8, the horizontal direction is an x axis, the vertical direction is a y axis, and the directions of these axes are referred to as an x axis direction and a y axis direction, respectively. Further, the circumferential direction about an axis perpendicular to both the x axis and the y axis is referred to as a θ direction. A direction of the axis which is the center of the θ direction and perpendicular to the x axis and the y axis is the longitudinal direction of the elongated material 1.

In FIG. 8, the final shape of the blade is shown by the alternate long and short dash line with respect to each of the x axis direction, the y axis direction, and the θ direction. Δx is a predicted deformation amount in the x axis direction with respect to the final shape of the blade, Δy is a predicted deformation amount in the y axis direction with respect to the final shape of the blade, and Δθ is a predicted deformation amount in the θ direction with respect to the final shape of the blade. When the surface treatment such as shot peening is applied to the elongated material 1 machined in the second machining step into a shape including such deformation amounts, the elongated material 1 is deformed by residual stress caused by the surface treatment by Δx in the x axis direction, by Δy in the y axis direction, and by Δθ in the θ direction into the final shape, so that the final shape of the blade can be obtained.

Therefore, in order to obtain the blade with a desired final shape, in the second machining step before the surface treatment, the elongated material 1 is machined into a shape displaced from the final shape of the blade by Δx in the x axis direction, by Δy in the y axis direction, and by Δθ in the θ direction.

REFERENCE SIGNS LIST

1 Elongated material
1a First end region
1b Second end region
2 Shroud
3 Projection
4 Blade root
6 Leading edge
7 Trailing edge
10 First holder
11 Base
12 Holding plate
13 Support
14 Bolt
20 Second holder
21 Base
22 Bush
23 Plate
24 First pad
25 Second pad
25a Base portion
25a1 Front surface
25b Protruding portion
25b1 Front surface
25b2 Side surface
30 Space
31 Frame
31a Through hole
32 Screw
33 Frame
33a Through hole
34 Screw
41 Holding plate
42 Bolt
43 Holding metal fitting
44 Bolt
45 Shim plate
51 Supporting portion
52 Shim plate
52 Frame
53a Through hole
54 Bolt
61 Rotating mechanism part
62 First sliding mechanism part
63 Second sliding mechanism part
64 Holding mechanism part
65 First slider
66 Second slider
C Re-holding position

The invention claimed is:

1. A method for machining a free-form surface on an elongated material having a first end region and a second end region with respect to a longitudinal direction, the method comprising:
   a step of holding the first end region and the second end region;
   a first machining step of machining the free-form surface on the elongated material with the first end region and the second end region held;
   a step of releasing holding of the first end region;
   a step of determining a re-holding position obtained by correcting a position of the first end region where a deformation amount of the elongated material derived from the machining of the free-form surface in the first machining step was corrected by releasing the holding of the first end region only by a deformation amount of the elongated material due to a weight of the elongated material;
   a step of holding the first end region again at the re-holding position; and
   a second machining step of further machining the free-form surface on the elongated material after holding the first end region again,
   wherein, in the step of determining the re-holding position, a position shifted from the position of the first end region after the holding of the first end region is released by the deformation amount is determined as the re-holding position.

2. The method according to claim 1, further comprising a step of subjecting the free-form surface to surface treatment after the second machining step.

3. The method according to claim 2, wherein a deformation amount of the elongated material due to residual stress caused by the surface treatment is predicted in advance, and the free-form surface is machined in the second machining step in consideration of the predicted deformation amount of the elongated material.

4. The method according to claim 1, wherein the first end region of the elongated material has a projection protruding from the first end region, and the first end region is held by holding the projection.

5. The method according to claim 1, wherein a product of the elongated material on which the free-form surface is machined is a blade.

6. The method according to claim 1, wherein the deformation amount of the elongated material due to the weight of the elongated material is determined by an analysis or an experiment in advance.

7. The method according to claim 1, wherein the deformation amount is a difference between a position of the first end region relative to the second end region when the elongated material is horizontally oriented and a position of the first end region relative to the second end region when the elongated material is vertically oriented.

8. The method according to claim 5, wherein the first end region and the second end region are held so that a chordwise direction is oriented in a vertical direction at a blade tip side of the blade.

9. The method according to claim 1, further comprising a step of vertically orientating the elongated material, with the holding of the first end region being released, after the step of releasing the holding of the first end region, wherein, in the step of determining the re-holding position, a position of the first end region relative to the second end region when the elongated material, with the holding of the first end region being released, is vertically oriented is determined as the re-holding position.

10. The method according to claim 1, wherein, after the second machining step, the step of releasing the holding of the first end region to the second machining step are repeated at least once.

* * * * *